Figure 1:
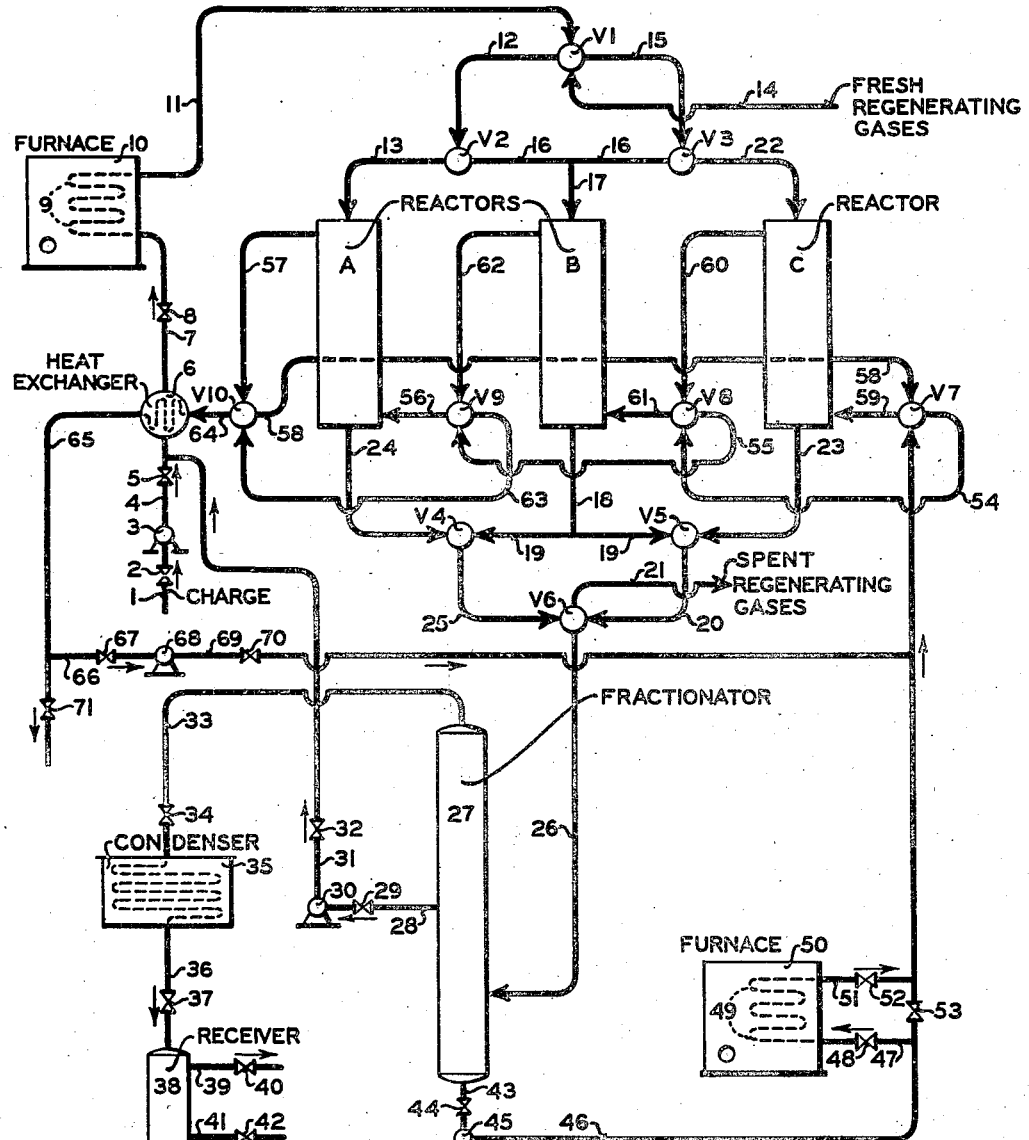

Nov. 26, 1940.  W. L. BENEDICT  2,223,162

PROCESS FOR THE LOW TEMPERATURE CONVERSION OF HYDROCARBON OILS

Filed Dec. 13, 1939

INVENTOR
WAYNE L. BENEDICT
BY Lee Gary
ATTORNEY

Patented Nov. 26, 1940

2,223,162

UNITED STATES PATENT OFFICE 2,223,162

PROCESS FOR THE LOW TEMPERATURE CONVERSION OF HYDROCARBON OILS

Wayne L. Benedict, Chicago, Ill., assignor to Universal Oil Products Company, Chicago, Ill., a corporation of Delaware Application December 13, 1939, Serial No. 308,938

7 Claims. (Cl. 196—52)

This invention relates to an improved method and means for conducting contact catalytic reactions and more specifically it is concerned with a process for effecting low temperature conversion reactions wherein the net heat of reaction in the conversion step is substantially zero, and the reactivation of the catalyst is exothermic.

In the low temperature conversion of hydrocarbon oils the heat of reaction is substantially zero and usually the reaction is accompanied with the deposition of carbonaceous substances on the particles of catalytic material. After the hydrocarbons have been contacted with the catalytic material for prolonged periods of time the deposition of carbonaceous substances in the pores and on the surface of the catalyst particles reaches such a point that it becomes necessary to remove the deposits in order to restore the catalytic material to substantially its original activity. Reactivation is ordinarily accomplished by burning carbonaceous substances from the catalytic material and this reaction is exothermic. Ordinarily, in order that the reaction may be accomplished in the required time, it is desirable to reactivate at elevated temperatures which, in most cases, is above that at which low temperature conversion is attempted.

In order to initiate and maintain the desired rate in reactivation, temperatures above 900° F. are desirable, while temperatures below 900° F. are preferred for conversion. It is necessary, therefore, for successful regeneration, after the catalytic material has lost some of its activity due to the deposition of carbonaceous substances, as previously described, to raise the temperature of the catalyst bed to that most desirable for reactivation. In addition, after reactivation has been completed, in order to avoid extremely high rates of conversion during the early stage of the process period, the temperature of the catalyst bed must be lowered to that most suitable for the conversion treatment.

My invention provides a novel and advantageous method for accomplishing the necessary heating and cooling in the various reaction zones and for utilizing the available heat formed in the system in preheating the charging oil or for other purposes. In order to successfully accomplish the objects of the invention, three reaction zones or groups of three reaction zones are preferably employed. In this case, while the reactants are subjected to conversion in one reaction zone, in a second reaction zone the catalyst which was previously reactivated may undergo cooling, while in a third reaction zone the catalyst is subjected to reactivation. The necessary heating and cooling may be accomplished by circulating refractory conversion products formed in the process after their being heated to the desired temperature level first in contact with the reaction zone in which the reactants are undergoing conversion, then in contact with the reaction zone being cooled to the conversion temperature, after which they are contacted with the reaction zone in which the catalyst is undergoing reactivation, and the resulting material subjected to further cracking treatment in a thermal cracking system or disposed of as desired.

In one specific embodiment the invention comprises heating a stream of reactants to the desired conversion temperature and subjecting the heated stream to contact with catalytic material in a reaction zone while contacting the heated fluid medium with the exterior thereof, as hereinafter described, to maintain the catalytic material and reactants at a uniform temperature, simultaneously therewith passing a stream of oxygen-containing reactivating gases in contact with the catalytic material in another reaction zone while passing a fluid medium in contact with the exterior thereof, as hereinafter described, to remove the exothermic heat of reactivation, cooling the catalytic material in a third reaction zone which had previously undergone reactivation by passing a fluid medium in contact with the exterior of this zone, as hereinafter described, and when the catalytic material in the first mentioned zone becomes fouled with the deposition of carbonaceous substances, switching the stream of reactants to the third mentioned reaction zone and switching the stream of reactivating gases to the first mentioned reaction zone whereby the third mentioned reaction zone becomes the conversion zone while the second mentioned reaction zone is being cooled and the catalytic material in the first mentioned reaction zone is undergoing reactivation, fractionating the products from the conversion treatment to separate fractionated vapors boiling in the range of gasoline from the higher boiling conversion products and condensing the latter as light and heavy reflux condensates, cooling and condensing said fractionated vapors and recovering the resulting distillates and gas, commingling said light reflux condensate with the charging oil and subjecting the mixture to treatment as said reactants, heating said heavy reflux condensate and passing it as said fluid medium in contact with the exterior of the first mentioned reaction zone to maintain a uniform temperature therein, subsequently passing said fluid medium in contact with the third mentioned reaction zone to cool the same, as previously described, after which said fluid medium is passed in contact with the exterior of the second mentioned reaction zone to absorb a substantial portion of the heat produced in reactivation and thereafter passing said fluid medium in indirect heat exchange relationship with the reactants to heat the latter and cool the former.

Figure 2:
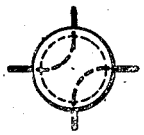
Figure 2A:
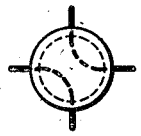

Figure 1 in the accompanying drawing illustrates diagrammatically in side elevation one specific form of the apparatus which may be employed embodying the broad features of the invention. Figures 2 and 2A are details of the four-way valves diagrammatically indicated in Figure 1, while Figures 3, 3A, 4, and 4A are details of the three-way valves diagrammatically indicated in Figure 1, Figures 2, 3, and 4 showing the valves in one position and Figures 2A, 3A, and 4A showing the passageways therethrough shifted.

Referring now to the drawing. Charging oil, which may comprise any relatively light hydrocarbon oil such as gas-oil or hydrocarbons boiling below gas-oil or any desired mixture thereof, is introduced through line 1 and valve 2 to pump 3. Pump 3 discharges through line 4 and valve 5 and the charging oil is commingled with light reflux condensate formed as hereinafter described, and the mixture introduced to heat exchanger 6. The mixture passes through heat exchanger 6 in indirect heat exchange relationship with the fluid medium introduced as hereinafter described, and is discharged therefrom through line 7 and valve 8 into heating coil 9. The mixture in passing through heating coil 9 is raised to the desired conversion temperature which may range, for example, from 500 to 900° F. preferably in the absence of any thermal cracking, heat being supplied by means of furnace 10. The heated reactants leaving heating coil 9 are directed through line 11 to valve V1 and the reactants thereafter subjected to treatment as hereinafter described.

In the particular case here illustrated, three reactors A, B, and C are employed and each reactor preferably contains a plurality of relatively small diameter tubes containing catalytic material capable of promoting the desired conversion reaction when in a fresh or freshly regenerated state. In addition, each reactor is preferably equipped with a means for introducing a fluid medium around the tubes for the purpose of supplying heat to or withdrawing heat from the reaction zone. It is not intended that the invention should be limited in this respect, however, for it may employ, if so desired, reactors of the type wherein the catalyst surrounds the tubes and the fluid medium passes through the tubes. One reactor is at all times employed as the conversion zone, while the catalytic material in another of the reaction zones is being reactivated by passing therethrough a stream of relatively inert gases (such as combustion gases, for example), containing controlled amounts of air or oxygen, and that in the third reaction zone is being cooled to the desired conversion temperature. The catalytic material in each of the three reactors is alternately employed in conversion, in reactivation, and in cooling in the sequence described, and when the streams of reactants and reactivating gases are switched, the catalytic material in the reactor which had been previously subjected to cooling is employed in conversion and that in the reactor employed in conversion is reactivated and that being reactivated is cooled, and upon subsequent switching of the separate streams the above procedure is followed to determine the service to which each of the separate reactors is subjected.

Switching of the stream of reactants and reactivating gases may be accomplished by means of inlet valves V1, V2, and V3, and switching of the conversion products and reactivating gases may be accomplished by means of outlet valves V4, V5, and V6 while the direction of the flow of the heat convective medium may be switched by means of valves V7, V8, V9, and V10. Any suitable valve arrangement capable of switching the direction of the flow of the stream of reactants, the stream of reactivating gases, and the stream of the fluid heat convective medium may be employed within the scope of the invention. For the sake of simplifying the description and illustrating the process without unnecessary complications, each of the switching valves employed are illustrated as either a single four-way valve or a single three-way valve in which the position of the passageways as illustrated in Figures 2, 3, and 4 may be shifted as illustrated in Figures 2A, 3A, and 4A.

Figure 4:
Figure 4A:
Figure 3:
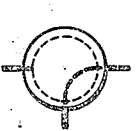
Figure 3A:
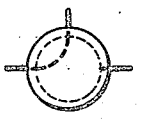

Assuming that the catalytic material in reactor A is employed in conversion, that in reactor B is undergoing regeneration, and that in reactor C is being cooled, valve V1 is adjusted to the position illustrated in Figure 2, valve V6 to the position illustrated in Figure 2A, valves V2 and V3 to the position illustrated in Figure 3, valves V4 and V5 to the position illustrated in Figure 4, and valves V7 and V8 regulating the flow of the fluid heat convective medium adjusted to the position illustrated in Figure 2, and valves V9 and V10 adjusted to the position illustrated in Figure 2A. In this case, heated reactants in line 11 pass through valve V1 into line 12 and thence through valve V2 into line 13 by means of which they are introduced to reactor A where they are contacted with a suitable catalytic material contained therein. During the conversion treatment in reactor A, a fluid heat convective medium is contacted with the exterior of the reaction zone in the manner to be described later, to maintain the catalytic materials and reactants at a substantially uniform temperature.

The preferred cracking catalysts for use in the present process consist in general of a precipitated alumina hydrogel and/or zirconia hydrogel composited with silica hydrogel, the gel composite being washed, dried, formed into particles, and calcined to produce a catalyst mass. The invention, however, is not limited to these particular catalysts, for other catalysts, such as, for example, the hydrosilicates of alumina, acid treated clays, and the like, may be used within the broad scope of the invention.

In the following specification and claims the terms silica, alumina, silica-zirconia, and silica-alumina-zirconia masses are used in the broad scope to designate the synthetic composites referred to above. The preferred catalysts may be prepared by precipitating silica from a solution as a hydrogel within or upon which the alumina and/or zirconia is deposited also by precipitation as hydrogels. The silica hydrogel may conveniently be prepared by acidifying an aqueous solution of sodium silicate by the addition of a required amount of hydrochloric acid. After precipitating, the silica gel is preferably washed until substantially free from alkali metal salts.

The washed silica hydrogel is then suspended in a solution of alumina and/or zirconium salts and an alkaline precipitant, such as ammonium hydroxide, ammonium carbonate or ammonium sulfide added to the solution to precipitate aluminum and/or hydrogels. The final precipitate, comprising essentially hydrated silica and hydrated alumina and/or zirconia, is washed to substantially completely remove water soluble materials and dried at about 300° F. to produce a rather crumbly and granular material which may be ground and pelleted or sized to produce particles of catalyst after which the catalyst particles are calcined at a temperature in the approximate range of 1000 to 1500° F. Various other procedures, such as, for example, co-precipitation of the hydrated gels may be employed, when desired, to produce the preferred catalyst.

While the hydrocarbon conversion reaction is being accomplished in reactor A, the catalytic material in reactor B may be subjected to reactivation treatment by contacting therewith a suitable inert gas, such as combustion gas, containing controlled amounts of air or oxygen. Fresh regenerating gases are introduced to the system through line 14 passing through valve V1 into line 15 and thence through valve V3 into line 16, after which they are directed through line 17 into reactor B.

The carbonaceous substances deposited upon the catalyst in the previous processing period are burned therefrom and the exothermic heat of regeneration is absorbed in the fluid heat convective medium contacted with the exterior of the reaction zone, as hereinafter described. Spent regenerating gases from reactor B are directed through line 18 into line 19 and thence through valve V5 into line 20, after which they pass through valve V6 into line 21 through which they are conducted to suitable heat exchange equipment, not shown, wherein the sensible heat of the gases is recovered and air or oxygen commingled with the resulting cooled gases and the mixture thereafter returned to reactor B as the fresh regenerating gases or, when desired, the spent regenerating gases may be exhausted from the system.

Simultaneously with the hydrocarbon conversion reaction being accomplished in reactor A and the regeneration in reactor B, the catalytic material contained in reactor C is isolated from the system and a suitable fluid heat convective medium contacted with the exterior of the reaction zone, as hereinafter described, to cool the catalytic material to the temperature level at which conversion is effected, the catalytic material in reactor C having previously undergone regeneration which, under ordinary conditions, leaves the catalytic material at a relatively high temperature level. Ordinarily, the low temperature conversion reaction is accomplished at temperatures below 900° F. and regeneration at temperatures above 900° F. necessitating the use of three reactors in order that the catalytic material contained in the reactor which has undergone regeneration may be cooled prior to its being employed in conversion. One of the reactors at all times is isolated from the conversion and regeneration system and the catalytic material contained therein cooled in the manner described in connection with reactor C.

The conversion products from reactor A are directed through line 24 to valve V4 wherethrough they pass into line 25 and thence through valve V6 into line 26 by means of which they are supplied to fractionator 27. The conversion products introduced to fractionator 27 are fractionated therein to separate fractionated vapors boiling in the range of gasoline from the higher boiling hydrocarbons and the latter condensed in the fractionating zone as light and heavy reflux condensates. Light reflux condensate condensed and collected in fractionator 27 is directed through line 28 and valve 29 to pump 30, which discharges through line 31 and valve 32 into line 4 wherein said light reflux condensate is commingled as previously described.

The fractionated vapors fractionated in fractionator 27 are directed through line 33 and valve 34 to cooling and condensation in condenser 35. Distillate, together with undissolved and uncondensed gases from condenser 35, is directed through line 36 and valve 37 into receiver 38 wherein the distillate and gases are collected and separated. The gases collected and separated in receiver 38 are removed from the upper portion thereof by way of line 39 and valve 40 and recovered as a product of the process or subjected to any desired further treatment. A portion of the distillate collected and separated in receiver 38 may be returned to the upper portion of fractionator 27 by well known means, not shown, as a cooling and refluxing medium and the residual portion thereof removed from receiver 38 by way of line 41 and valve 42 and directed to storage or subjected to any desired further treatment.

Preferably and in the case here illustrated, heavy reflux condensate formed in fractionator 27 because of its refractory character is employed as the fluid heat convective medium utilized in the various reaction zones. The heavy reflux condensate is removed from fractionator 27 through line 43 and is directed through valve 44 to pump 45. Pump 45 discharges through line 46 and when the temperature of the heavy reflux condensate is below that most suitable for maintaining a uniform temperature in the reaction zone to which the reactants are introduced it may be directed through line 47 and valve 48 into heating coil 49 and in passing therethrough raised to the desired temperature level by means of heat supplied from furnace 50. The heated heavy reflux condensate leaving heating coil 49 is returned to line 46 by means of line 51 and valve 52. If, on the other hand, the heavy reflux condensate from fractionator 27 is at the desired temperature level, it may be directed through valve 53 thereby by-passing heating coil 49. In any case, the heavy reflux condensate in line 46, which hereinafter will be referred to as the fluid heat convective medium, is conducted to valve V7.

The fluid heat convective medium passes through valve V7 into line 54 and thence through valve V8 into line 55 and thence through valve V9 into line 56 by means of which it is introduced to reactor A. The fluid heat convective medium introduced to reactor A passes therethrough in contact with the exterior of the reaction zone and serves to maintain the catalytic material and the reactants at a substantially uniform temperature. The fluid medium leaving reactor A is directed through line 57 to valve V10 wherethrough it passes into line 58 and thence through valve V7 into line 59 by means of which it is introduced to reactor C passing therethrough in contact with the exterior of the reaction zone thereby absorbing excess heat retained by the catalytic material after regeneration. The fluid medium leaving reactor C is directed through line 60 to valve V8 wherethrough it passes into line 61 and thence into reactor B wherethrough it passes in contact with the exterior of the reaction zone absorbing heat produced in regenerating the catalyst. The fluid medium leaving reactor B is directed through line 62 to valve V9, passing therethrough into line 63 and thence through valve V10 into line 64 by means of which it is introduced to heat exchanger 6. The fluid medium passes through heat exchanger 6 in indirect heat exchange relationship with the incoming reactants and is discharged therefrom through line 65. A portion of the fluid medium in line 65 may be directed through line 66 and valve 67 to pump 68, which discharges through line 69 and valve 70 into line 46, whereupon said fluid medium is returned for treatment as previously described in commingled state with the fresh material obtained from fractionator 27. The residual portion of the fluid medium in line 65 may be directed through valve 71 and supplied to a thermal cracking system or recovered as a product of the process or disposed of in any desirable manner.

In the conversion operation, as above described, when the catalytic material in reactor A approaches the state of reduced activity, at which time it is advantageous to apply freshly regenerated catalyst for the treatment of the reactants, the supply of air to the regenerating gas stream is momentarily discontinued so that reactor B is purged of oxygen-containing gases. After the purging in reactor B is completed valve V1 is switched to the position illustrated in Figure 2A, valve V3 is switched to the position illustrated in Figure 3A, and valve V5 is switched to the position illustrated in Figure 4A at which time oxygen-free gases are introduced to reactor A and the reactants to reactor C, reactor B being isolated from the conversion and reactivating system. After a lag corresponding to the time required to drive the reactants from reactor A and the oxygen-free gases which had been retained in reactor C, valve V6 is switched to the position illustrated in Figure 2, the positions of valves V2 and V4 remaining unchanged, at which time oxygen is again admitted to the regenerating gas stream. Either prior to or subsequent to the switching of the valves regulating the direction of the flow of reactants and reactivating gases, in order to accomplish the desired heating and cooling in the various reactors, valve V7 is switched to the position illustrated in Figure 2A, the position of valve V8 remaining unchanged, and valves V9 and V10 switched to the positions illustrated in Figure 2.

After all of the valves have been adjusted to their new position, the flow of reactants in line 11 will be through valve V1 into line 15 and through valve V3 into line 22 and thence into reactor C, and the conversion products from reactor C will flow through line 23, valve V5, line 20, and valve V6 into line 26. The flow of the fluid heat convective medium in line 46 will be through valve V7 into line 59 through reactor C into line 60 through valve V8 into line 61 through reactor B into line 62 through valve V9 into line 56 through reactor A into line 57 and thence through valve V10 into line 64, the flow thereafter being substantially as described.

When the catalyst in reactor B approaches the state of reduced activity, at which time it is advantageous to apply freshly regenerated catalyst to the treatment of the reactants, the same treatment with regard to purging as above described, may be followed prior to the change in service of the various reactors. For example, after the purging of reactor A is completed, valve V1 is switched to the position illustrated in Figure 2 and valves V2 and V3 are switched to the position illustrated in Figure 3A, at which time oxygen-free gases are introduced to reactor C and reactants to reactor B. After a lag corresponding to the time required to purge reactor C of hydrocarbon vapors and reactor B of the oxygen-free purging gases, valves V4 and V5 are switched to the position illustrated in Figure 4A and valve V6 is switched to the position illustrated in Figure 2A, and at this time oxygen is again admitted to the regenerating gas stream.

As before, prior to or subsequent to the switching of the flow of reactants and reactivating gases, the valves controlling the direction of the flow of the heat convective medium are also adjusted to their proper positions. In the particular case here illustrated, valve V7 would be adjusted to the position illustrated in Figure 2, valve V8 to the position illustrated in Figure 2A, valve V9 to the position illustrated in Figure 2, and valve V10 to the position illustrated in Figure 2A. After valves V7, V8, V9, and V10 are adjusted to their proper positions, the flow of the heat convective medium in line 46 would be through valve V7 into line 54 through valve V8 into line 61 through reactor B into line 62 through valve V9 into line 56 through reactor A into line 57 through valve V10 into line 58 through valve V7 into line 59 through reactor C into line 60 through valve V8 into line 55 through valve V9 into line 63 and thence through valve V10 into line 64, the flow thereafter being substantially as described.

The switching valves may be manually operated but preferably to simplify operation of the process and to avoid mistakes in the operation of the valves, all of the valves will preferably operate from a single time cycle controller of any well known form in accordance with a definite predetermined schedule.

An example of one specific operation of the process is approximately as follows:

The reactants comprising a mixture of a 36.6° A. P. I. gravity Mid-Continent gas-oil and light reflux condensate formed in the process were heated to a temperature of 680° F. and passed in contact with a silica-alumina-zirconia catalyst at a superatmospheric pressure of 100 pounds per square inch and at a liquid hourly space velocity of 1 (volume of reactants per unit volume of catalyst per hour).

Three reaction zones were employed, the catalyst in one of the three zones being in service for conversion at all times. The procedure followed with respect to each of the reaction zones was approximately as follows: The catalyst in one zone was utilized in the conversion reaction while the catalyst in a second zone was being reactivated and while that in a third zone was being cooled from the temperature reached during reactivation to approximately the temperature at which the conversion reaction was effected.

Reactivation of the catalytic material was accomplished by passing a stream of combustion gases containing from 1 to 1½% oxygen in contact with the carbonized catalytic material. Due to the exothermic nature of the reaction, in order to avoid seriously damaging the catalytic material, a fluid heat convective medium was passed in indirect heat exchange relationship with the reaction zone, as hereinafter described. Since reactivation was accomplished, at a temperature in the neighborhood of 1300° F., the catalytic material was cooled in order to avoid overcracking in the subsequent conversion period.

The products of the conversion reaction were fractionated to separate fractionated vapors boiling in the range of gasoline from the higher boiling hydrocarbons and the latter were condensed as light and heavy reflux condensates and the light reflux condensate commingled with the charging oil for treatment as previously described. The fractionated vapors were subjected to cooling and condensation and the resulting distillate and gas collected and separated. Gasoline corresponding to approximately 60.0% by volume of the charging oil was recovered as a product of the process.

The heavy reflux condensate was heated to a temperature of approximately 750° F. and passed in indirect heat exchange relationship with the various reaction zones in the manner set forth in the foregoing description. The heavy reflux condensate leaving the last reaction zone at a temperature of approximately 975° F. and corresponding to approximately 26% by volume of the charging oil was cooled and recovered as a product of the process.

I claim as my invention:

1. In a process for the conversion of hydrocarbon oil employing a plurality of reaction zones wherein a stream of reactants is introduced to one reaction zone and passed in contact with catalytic material in the presence of which conversion occurs, a stream of reactivating gases is introduced to another zone to exothermically reactivate catalytic material contained therein, and wherein catalytic material in a third reaction zone which had previously been reactivated is cooled to the temperature desired in conversion, the improvement which comprises passing conversion products formed in the process first in contact with the exterior of the reaction zone in which the reactants are undergoing conversion to maintain a substantially uniform temperature therein, then in contact with the exterior of the reaction zone in which the catalytic material is being cooled to absorb excess heat contained therein and then in contact with the exterior of the reaction zone in which the catalytic material is undergoing reactivation to absorb heat produced during said reactivation.

2. In a process for catalytic cracking of hydrocarbon oil employing a plurality of reaction zones wherein a stream of reactants is introduced to one reaction zone and passed in contact with catalytic material capable of promoting the desired conversion reactions whose heat of reaction is substantially zero, a stream of oxygen-containing gases is introduced to another reaction zone to exothermically reactivate catalytic material contained therein, and wherein catalytic material in a third reaction zone which has previously been reactivated is cooled to the temperature desired in conversion, the improvement which comprises passing conversion products formed in the process first in contact with the exterior of the reaction zone in which the reactants are undergoing conversion to maintain a substantially uniform temperature therein, then in contact with the exterior of the reaction zone in which the catalytic material is being cooled to absorb excess heat contained therein and then in contact with the exterior of the reaction zone in which the catalytic material is undergoing reactivation to absorb heat produced during said reactivation.

3. In a process for catalytic cracking of hydrocarbon oil employing a plurality of reaction zones wherein a stream of reactants is introduced to one reaction zone and passed in contact with catalytic material capable of promoting the desired conversion reactions, whose heat of reaction is substantially zero, a stream of oxygen-containing gases is introduced to another reaction zone to exothermically reactivate catalytic material contained therein, and wherein catalytic material in a third reaction zone which has previously been reactivated is cooled to the temperature desired in conversion, and alternately subjecting the catalytic material in each reaction zone to treatment in conformity with the following sequence: conversion, regeneration, and cooling, the improvement which comprises passing conversion products formed in the process first in contact with the exterior of the reaction zone in which the reactants are undergoing conversion to maintain a substantially uniform temperature therein, then in contact with the exterior of the reaction zone in which the catalytic material is being cooled to absorb excess heat contained therein and then in contact with the exterior of the reaction zone in which the catalytic material is undergoing reactivation to absorb heat produced during said reactivation.

4. A process for the conversion of hydrocarbon oil, which comprises passing a stream of reactants consisting essentially of charging oil and light reflux condensate formed as hereinafter described, in indirect heat exchange relationship with a fluid heat convective medium supplied as hereinafter set forth, subsequently heating said reactants to the desired conversion temperature and passing said reactants in the heated state in contact with catalytic material in one reaction zone, simultaneously therewith reactivating catalytic material in another reaction zone by passing a stream of oxygen-containing reactivating gases in contact therewith and cooling catalytic material previously reactivated in a third reaction zone, as hereinafter set forth, fractionating the products of the conversion treatment to separate fractionated vapors boiling in the range of gasoline from the higher boiling hydrocarbons and condensing the latter as light and heavy reflux condensates, cooling and condensing said fractionated vapors and recovering the resulting distillate and gas, commingling said light reflux condensate with the charging oil, as previously set forth, passing said heavy reflux condensate as said fluid heat convective medium first in contact with the reaction zone in which said reactants are undergoing conversion to maintain a substantially uniform temperature therein, then in contact with the exterior of the reaction zone in which the catalytic material is being cooled to absorb the excess heat contained in said catalytic material, then in contact with the exterior of the reaction zone in which the catalytic material is undergoing regeneration to absorb heat produced during said regeneration, and thereafter passing said fluid heat convective medium in indirect heat exchange relationship with said reactants, as previously set forth.

5. The process set forth in claim 4 wherein the heavy reflux condensate employed as the fluid heat convective medium is heated to substantially the temperature employed in the conversion reaction in a heating zone external to the reaction zones prior to its introduction to the exterior of the reaction zone in which conversion is being effected.

6. A process for the conversion of hydrocarbon oil, which comprises passing a stream of reactants consisting essentially of charging oil and light reflux condensate formed as hereinafter set forth, in indirect heat exchange relationship with a fluid heat convective medium supplied as hereinafter set forth, subsequently heating said reactants to the desired conversion temperature and passing said reactants in the heated state in contact with catalytic material in one reaction zone, simultaneously therewith reactivating catalytic material in another reaction zone by passing a stream of oxygen-containing reactivating gases in contact therewith and cooling catalytic material previously reactivated in a third reaction zone, as hereinafter set forth, fractionating the products of the conversion treatment to separate fractionated vapors boiling in the range of gasoline from the higher boiling hydrocarbons and condensing the latter as light and heavy reflux condensates, cooling and condensing said fractionated vapors and recovering the resulting distillate and gas, commingling said light reflux condensate with the charging oil, as hereinbefore set forth, passing said heavy reflux condensate as said fluid heat convective medium first in contact with the reaction zone in which said reactants are undergoing conversion to maintain a substantially uniform temperature therein, then in contact with the exterior of the reaction zone in which the catalytic material is being cooled to absorb the excess heat contained in said catalytic material, then in contact with the exterior of the reaction zone in which the catalytic material is undergoing regeneration to absorb heat produced during said regeneration thereafter passing said fluid heat convective medium in indirect heat exchange relationship with said reactants, as previously described, recovering a portion of said fluid heat convective medium and commingling the residual portion thereof with said heavy reflux condensate, and utilizing the resulting mixture as said fluid heat convective medium.

7. A process for the conversion of hydrocarbon oil, which comprises passing a stream of reactants consisting essentially of charging oil and light reflux condensate formed as hereinafter set forth, in indirect heat exchange relationship with a fluid heat convective medium supplied as hereinafter set forth, subsequently heating said reactants to the desired conversion temperature and passing said reactants in the heated state in contact with catalytic material in one reaction zone, simultaneously therewith reactivating catalytic material in another reaction zone by passing a stream of oxygen-containing reactivating gases in contact therewith and cooling catalytic material previously reactivated in a third reaction zone, as hereinafter set forth, and alternately employing each of said reaction zones first in conversion, then in regeneration and then in cooling, fractionating the products of the conversion treatment to separate fractionated vapors boiling in the range of gasoline from the higher boiling hydrocarbons and condensing the latter as light and heavy reflux condensates, cooling and condensing said fractionated vapors and recovering the resulting distillate and gas, commingling said light reflux condensate with the charging oil, as previously described, passing said heavy reflux condensate as said fluid heat convective medium first in contact with the reaction zone in which said reactants are undergoing conversion to maintain a substantially uniform temperature therein, then in contact with the exterior of the reaction zone in which the catalytic material is being cooled to absorb the excess heat contained in said catalytic material, then in contact with the exterior of the reaction zone in which the catalytic material is undergoing regeneration to absorb heat produced during said regeneration and thereafter passing said fluid heat convective medium in indirect heat exchange relationship with said reactants, as hereinbefore set forth.

WAYNE L. BENEDICT.